(12) United States Patent
Lee et al.

(10) Patent No.: US 9,243,687 B2
(45) Date of Patent: Jan. 26, 2016

(54) POWER TRANSMITTING APPARATUS FOR VEHICLE

(71) Applicant: Hyundai Motor Company, Seoul (KR)

(72) Inventors: Sueng Ho Lee, Seoul (KR); Chang Wook Lee, Suwon-si (KR); Jongsool Park, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 129 days.

(21) Appl. No.: 14/092,009

(22) Filed: Nov. 27, 2013

(65) Prior Publication Data

US 2014/0144265 A1     May 29, 2014

(30) Foreign Application Priority Data

Nov. 28, 2012   (KR) ........................ 10-2012-0136464

(51) Int. Cl.
| | |
|---|---|
| F16H 3/04 | (2006.01) |
| F16H 3/08 | (2006.01) |
| F16H 59/00 | (2006.01) |
| F16H 61/00 | (2006.01) |
| F16H 63/00 | (2006.01) |
| F16H 3/00 | (2006.01) |
| F16H 3/093 | (2006.01) |

(52) U.S. Cl.
CPC ................ *F16H 3/006* (2013.01); *F16H 3/093* (2013.01); *F16H 2003/0931* (2013.01); *F16H 2200/0056* (2013.01); *Y10T 74/19233* (2015.01)

(58) Field of Classification Search
CPC ........... F16H 3/08; F16H 3/006; F16H 3/093; F16H 3/091; F16H 2003/0931; F16H 2200/0056
See application file for complete search history.

(56) References Cited

U.S. PATENT DOCUMENTS

| 7,155,994 B2 | 1/2007 | Gumpoltsberger | |
| 7,383,749 B2 | 6/2008 | Schäfer et al. | |
| 2006/0266141 A1* | 11/2006 | Ogami | F16H 3/006 74/325 |
| 2009/0120221 A1* | 5/2009 | Chazotte | F16H 3/006 74/330 |
| 2011/0023638 A1* | 2/2011 | Mohlin | F16H 3/006 74/330 |

FOREIGN PATENT DOCUMENTS

| JP | 4361794 B2 | 8/2009 |
| JP | 4566199 B2 | 8/2010 |
| KR | 10-1181746 B1 | 9/2012 |

* cited by examiner

*Primary Examiner* — William Kelleher
*Assistant Examiner* — Jake Cook
(74) *Attorney, Agent, or Firm* — Morgan, Lewis & Bockius LLP

(57) ABSTRACT

A power transmitting apparatus for a vehicle achieves seven forward speeds with a minimal number of input gears disposed on input shafts, since the second speed gear and the fourth speed gear are simultaneously engaged with the second input gear and the third speed gear and the seventh speed gear are simultaneously engaged with the third input gear, and distortion of step ratios at the high-speed region may be prevented.

12 Claims, 3 Drawing Sheets

FIG.2

| Shift step | CL1 | CL2 | SL1 | | | SL2 | | | SL3 | | | SL4 | | |
|---|---|---|---|---|---|---|---|---|---|---|---|---|---|---|
| | | | D1 | N | D3 | D2 | N | RG | D4 | N | D6 | D5 | N | D7 |
| R | | ● | ○ | | | | | ● | | ○ | | | ○ | |
| 1ST | ● | | ● | | | | ○ | | | ○ | | | ○ | |
| 2ST | | ● | ○ | | | ● | | | | ○ | | | ○ | |
| 3ST | ● | | | | ● | | ○ | | | ○ | | | ○ | |
| 4ST | | ● | ○ | | | | ○ | | ● | ○ | | | ○ | |
| 5ST | ● | | | ○ | | | ○ | | | | | ● | | |
| 6ST | | ● | ○ | | | | ○ | | | ○ | ● | | ○ | |
| 7ST | ● | | ○ | | | | ○ | | | | | | | ● |

● : Operating position    ○ : Neutral position

POWER TRANSMITTING APPARATUS FOR VEHICLE

CROSS-REFERENCE TO RELATED APPLICATION

The present application claims priority of Korean Patent Application Number 10-2012-0136464 filed Nov. 28, 2012, the entire contents of which application is incorporated herein for all purposes by this reference.

BACKGROUND OF INVENTION

1. Field of Invention

The present invention relates to a double clutch power transmitting apparatus. More particularly, the present invention relates to a power transmitting apparatus for a vehicle which improves mountability by minimizing a length of the power transmitting apparatus and enhances drivability and fuel economy by preventing distortion of step ratios.

2. Description of Related Art

Environmentally-friendly technique of vehicles is very important technique on which survival of future motor industry is dependent. Vehicle makers are focusing on development of environmentally-friendly vehicles so as to meet environment and fuel consumption regulations.

Some examples of future vehicle technique are an electric vehicle (EV) and a hybrid electric vehicle (HEV) that use electrical energy, and double clutch transmission (DCT) that improves efficiency and convenience.

The DCT includes two clutch devices and a gear train applied to a manual transmission. The DCT selectively transmits torque input from an engine to two input shafts by using two clutches, changes a speed by using the gear train, and outputs the changed torque.

Such the DCT is used to realize a compact transmission having more than five forward speeds. Since two clutches and synchronizing devices are controlled by a controller according to the DCT, manual shift maneuver is unnecessary for controlling the DCT. Therefore, the DCT is one type of automated manual transmissions (AMT).

The DCT, compared with an automatic transmission using planetary gear sets, has excellent power delivery efficiency and change and addition of components is very easy in the DCT. Therefore, the DCT can meet fuel consumption regulations and multi-speeds efficiency may be improved.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a power transmitting apparatus for a vehicle having advantages of improving mountability by minimizing a length of the power transmitting apparatus and enhancing drivability and fuel economy by preventing distortion of step ratios.

A power transmitting apparatus for a vehicle according to one aspect of the present invention may include: a variable connecting device including a first clutch and a second clutch and selectively outputting torque of an engine through the first clutch and the second clutch; an input device including a first input shaft selectively connected to the engine through the second clutch and provide with first, second, and sixth input gears fixedly disposed on an exterior circumference thereof, and a second input shaft selectively connected to the engine through the first clutch and provided with third, fourth, and fifth input gears fixedly disposed on an exterior circumference thereof; a speed output device including a first output shaft disposed in parallel with the first and second input shafts, a first speed output unit disposed on the first output shaft and provided with first and second synchronizer modules, a second output shaft disposed in parallel with the first and second input shafts, and a second speed output unit disposed on the second output shaft and provided with third and fourth synchronizer modules; a reverse speed device including a reverse speed shaft and an idle gear and a reverse input gear fixedly disposed on the reverse speed shaft, wherein the idle gear is engaged with any one input gear on the first and second input shafts and the reverse input gear is engaged with any one synchronizer module disposed on the first output shaft; and first, second, third, fourth, fifth, sixth, and seventh speed gears and a reverse speed gear included in the first, second, third, and fourth synchronizer modules, wherein the second speed gear and the fourth speed gear are simultaneously engaged with the second input gear disposed on the first input shaft, and the third speed gear and the seventh speed gear are simultaneously engaged with the third input gear disposed on the second input shaft.

The first input shaft may be a hollow shaft and the sixth, first and second input gears may be disposed on the exterior circumference of the first input shaft in a named sequence from a front portion to a rear portion. At least a portion of the second input shaft may be inserted in the first input shaft, and the third, fifth and fourth input gears may be disposed on a portion of the second input shaft penetrating the first input shaft in a named sequence from a front portion to a rear portion.

The first synchronizer module may include the third speed gear engaged with the third input gear and the first speed gear engaged with the fifth input gear.

The second synchronizer module may include the reverse speed gear engaged with the reverse input gear connected to the idle gear engaged with the sixth input gear through the reverse speed shaft, and the second speed gear engaged with the second input gear.

The third synchronizer module may include the sixth speed gear engaged with the first input gear and the fourth speed gear engaged with the second input gear.

The fourth synchronizer module may include the seventh speed gear engaged with the third input gear and the fifth speed gear engaged with the fourth input gear.

The sixth, first and second input gears may be disposed on the exterior circumference of the first input shaft in a named sequence from a front portion to a rear portion. The second input shaft may be a hollow shaft and the third, fifth and fourth input gears may be disposed on the exterior circumference of the second input shaft in a named sequence from a front portion to a rear portion. At least a portion of the first input shaft may be inserted in the second input shaft.

The first synchronizer module may include the third speed gear engaged with the third input gear and the first speed gear engaged with the fifth input gear.

The second synchronizer module may include the reverse speed gear engaged with the reverse input gear connected to the idle gear engaged with the sixth input gear through the reverse speed shaft, and the second speed gear engaged with the second input gear.

The third synchronizer module may include the sixth speed gear engaged with the first input gear and the fourth speed gear engaged with the second input gear.

The fourth synchronizer module may include the seventh speed gear engaged with the third input gear and the fifth speed gear engaged with the fourth input gear.

A power transmitting apparatus for a vehicle according to another aspect of the present invention may include: a first clutch connected to an engine and selectively outputting torque of the engine; a second clutch connected to the engine and selectively outputting the torque of the engine; a first input shaft being a hollow shaft, selectively receiving the torque of the engine through the second clutch, and provided with sixth, first and second input gears disposed on an exterior circumference thereof in a named sequence; a second input shaft penetrating the first input shaft without rotational interference therebetween, selectively receiving the torque of the engine through the first clutch, and provided with third, fifth and fourth input gears disposed on an exterior circumference thereof in a named sequence; first and second output shafts disposed in parallel with the first and second input shafts; a first synchronizer module disposed on the first output shaft, and including a third speed gear engaged with the third input gear and a first speed gear engaged with the fifth input gear; a second synchronizer module disposed on the first output shaft, and including a reverse speed gear engaged with a reverse input gear connected to an idle gear engaged with the sixth input gear through a reverse speed shaft and a second speed gear engaged with the second input gear; a third synchronizer module disposed on the second output shaft, and including a sixth speed gear engaged with the first input gear and a fourth speed gear engaged with the second input gear; and a fourth synchronizer module disposed on the second output shaft, and including a seventh speed gear engaged with the third input gear and a fifth speed gear engaged with the fourth input gear.

A power transmitting apparatus for a vehicle according to other aspect of the present invention may include: a first clutch connected to an engine and selectively outputting torque of the engine; a second clutch connected to the engine and selectively outputting the torque of the engine; a first input shaft selectively receiving the torque of the engine through the second clutch and provided with sixth, first and second input gears disposed on an exterior circumference thereof in a named sequence; a second input shaft being a hollow shaft, selectively receiving the torque of the engine through the first clutch, and provided with third, fifth and fourth input gears disposed on an exterior circumference thereof in a named sequence, at least a portion of the first input shaft being inserted in the second input shaft; first and second output shafts disposed in parallel with the first and second input shafts; a first synchronizer module disposed on the first output shaft, and including a third speed gear engaged with the third input gear and a first speed gear engaged with the fifth input gear; a second synchronizer module disposed on the first output shaft, and including a reverse speed gear engaged with a reverse input gear connected to an idle gear engaged with the sixth input gear through a reverse speed shaft and a second speed gear engaged with the second input gear; a third synchronizer module disposed on the second output shaft, and including a sixth speed gear engaged with the first input gear and a fourth speed gear engaged with the second input gear; and a fourth synchronizer module disposed on the second output shaft, and including a seventh speed gear engaged with the third input gear and a fifth speed gear engaged with the fourth input gear.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of an exemplary power transmitting apparatus for a vehicle according to the present invention.

DETAILED DESCRIPTION

Figure 1:
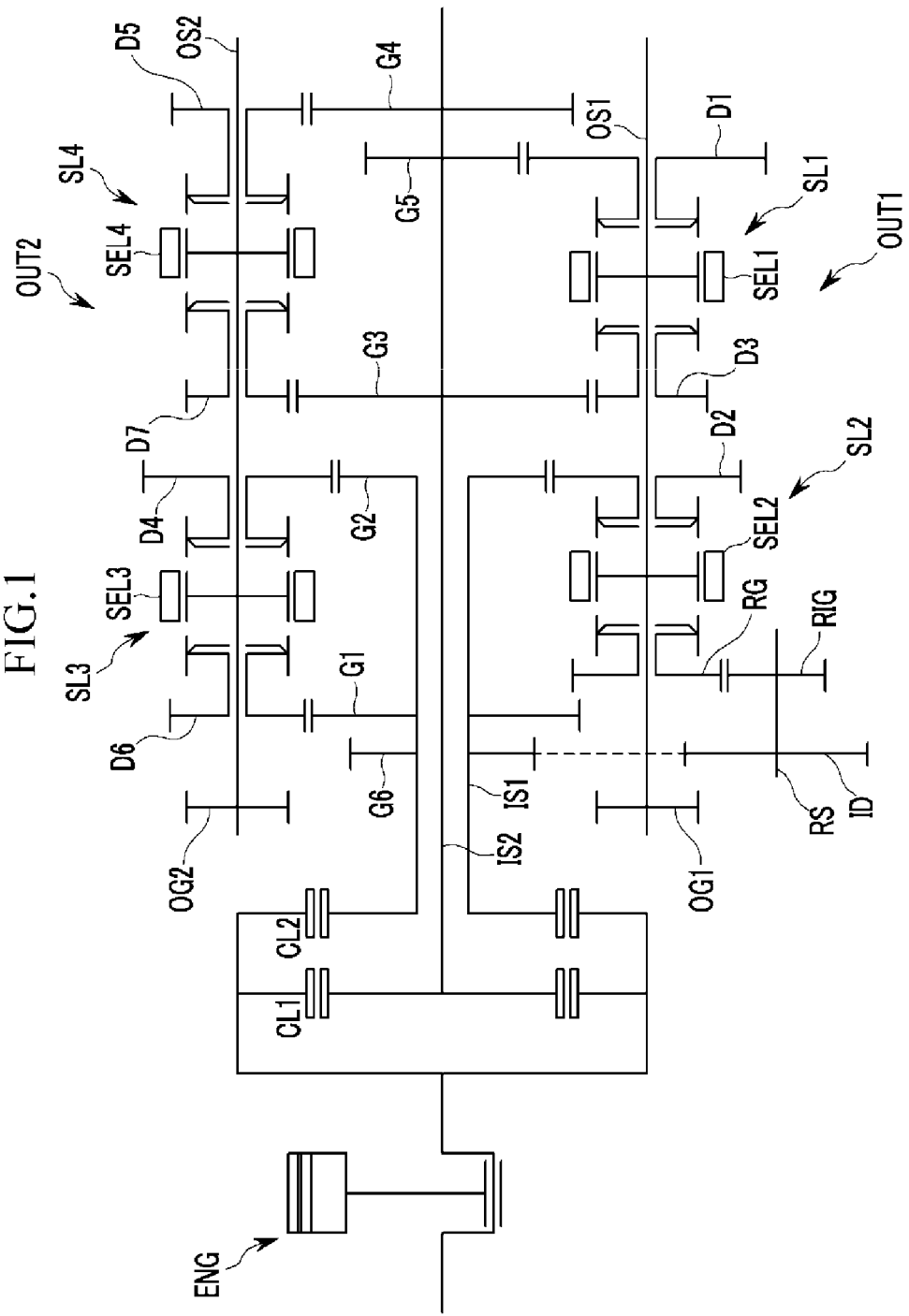
FIG. 1 is a schematic diagram of an exemplary power transmitting apparatus for a vehicle according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Description of components that are not necessary for explaining the various embodiments will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a power transmitting apparatus for a vehicle according to the present invention.

Referring to FIG. 1, a power transmitting apparatus according to various embodiments of the present invention includes a variable connecting device CL1 and CL2, an input device IS1 and IS2, a speed output device OUT1 and OUT2, and a reverse speed device RS, ID, and RIG.

The variable connecting device includes first and second clutches CL1 and CL2.

The first clutch CL1 and the second clutch CL2 selectively transmits torque of an engine ENG that is a power source respectively to a second input shaft IS2 and a first input shaft IS1.

The first clutch CL1 selectively connects the second input shaft IS2 with an output side of the engine ENG, and the second clutch CL2 selectively connects the first input shaft IS1 with the output side of the engine ENG.

The first and second clutches CL1 and CL2 forming the variable connecting device may be conventional multi-plate clutches of wet type, and are controlled by a hydraulic control system.

The input device includes the first and second input shafts IS1 and IS2.

The first input shaft IS1 is a hollow shaft, and a front end portion of the first input shaft IS1 is selectively connected to the output side of the engine ENG through the second clutch CL2.

In addition, sixth, first and second input gears G6, G1, and G2 are disposed on the first input shaft IS1 with predetermined distances in a named sequence from a front portion to a rear portion.

The second input shaft IS2 is inserted in the first input shaft IS1 without rotational interference with the first input shaft IS1. A front end portion of the second input shaft IS2 is selectively connected to the output side of the engine ENG through the first clutch CL1.

In addition, third, fourth, and fifth input gears G3, G4, and G5 are disposed on the second input shaft IS2 with predetermined distances. The third, fourth, and fifth input gears G3, G4, and G5 are positioned at a rear portion of the second input shaft IS2 penetrating the first input shaft IS1 and are disposed in a sequence of the third, fifth, and fourth input gears G3, G5, and G4 from a front portion to a rear portion.

The first, second, third, fourth, fifth, and sixth input gears G1, G2, G3, G4, G5, and G6 are input gears operating at each speed. That is, the first input gear G1 is operated at a sixth forward speed, the second input gear G2 is operated at a second forward speed and a fourth forward speed, the third input gear G3 is operated at a third forward speed and a seventh forward speed, the fourth input gear G4 is operated at a fifth forward speed, the fifth input gear G5 is operated at a first forward speed, and the sixth input gear G6 is operated at a reverse speed.

That is, the input gears for even-numbered speeds and the reverse speed are disposed on the first input shaft IS1, and the input gears for odd-numbered speeds are disposed on the second input shaft IS2.

The speed output device is adapted to receive torque from each input gear of the input device, convert torque, and output the converted torque. The speed output device includes first and second speed output units OUT1 and OUT2 disposed in parallel with the first and second input shafts IS1 and IS2.

The first speed output unit OUT1 includes a first output shaft OS1 disposed in parallel with the first and second input shafts IS1 and IS2, a first synchronizer module SL1 including a first speed gear D1 and a third speed gear D3, and a second synchronizer module SL2 including a second speed gear D2 and a reverse speed gear RG.

The first synchronizer module SL1 is disposed on a rear portion of the first output shaft OS1, and the second synchronizer module SL2 is disposed on a front portion of the first output shaft OS1.

The first speed gear D1 of the first synchronizer module SL1 is engage with the fifth input gear G5, and the third speed gear D3 of the first synchronizer module SL1 is engaged with the third input gear G3.

The second speed gear D2 of the second synchronizer module SL2 is engaged with the second input gear G2.

In addition, the torque converted by the first speed output unit OUT1 is transmitted to a conventional differential device through a first output gear OG1 mounted at a front end portion of the first output shaft OS1.

The second speed output unit OUT2 includes a second output shaft OS2 disposed in parallel with the first and second input shafts IS1 and IS2, a third synchronizer module SL3 including a sixth speed gear D6 and a fourth speed gear D4, and a fourth synchronizer module SL4 including a seventh speed gear D7 and a fifth speed gear D5.

The third synchronizer module SL3 is disposed on a front portion of the second output shaft OS2 and the fourth synchronizer module SL4 is disposed on a rear portion of the second output shaft OS2.

The sixth speed gear D6 of the third synchronizer module SL3 is engaged with the first input gear G1, and the fourth speed gear D4 of the third synchronizer module SL3 is engaged with the second input gear G2.

The seventh speed gear D7 of the fourth synchronizer module SL4 is engaged with the third input gear G3, and the fifth speed gear D5 of the fourth synchronizer module SL4 is engaged with the fourth input gear G4.

In addition, the torque converted by the second speed output unit OUT2 is transmitted to the conventional differential device through the second output gear OG2 mounted at a front end portion of the second output shaft OS2.

The reverse speed device includes a reverse speed shaft RS, and an idle gear ID and a reverse input gear RIG integrally formed with the reverse speed shaft RS. One will appreciate that such integral components may be monolithically formed.

The idle gear ID is engaged with the sixth input gear G6, and the reverse input gear RIG is engaged with the reverse speed gear RG. Therefore, if the first input shaft IS1 rotates, torque of the sixth input gear G6 is transmitted to the reverse speed gear RG as an inverse rotation speed and the inverse rotation speed is transmitted to the conventional differential device through the first output shaft OS1.

Since the first, second, third, and fourth synchronizer modules SL1, SL2, SL3, and SL4 are well known to a person of an ordinary skill in the art, detailed description thereof will be omitted. In addition, sleeves SLE1, SLE2, SLE3, and SLE4 applied respectively to the first, second, third, and fourth synchronizer modules SL1, SL2, SL3, and SL4, as well known to a person of an ordinary skill in the art, are operated by additional actuators and the actuators are controlled by a transmission control unit.

FIG. 2 is an operational chart of various embodiments including the power transmitting apparatus of FIG. 1.

Reverse Speed

At the reverse speed R, as shown in FIG. 2, the first output shaft OS1 and the reverse speed gear RG are operably connected by the sleeve SEL2 of the second synchronizer module SL2. After that, the second clutch CL2 is operated. Then, shift to the reverse speed is completed.

First Forward Speed

At the first forward speed $1^{ST}$, as shown in FIG. 2, the first speed gear D1 and the first output shaft OS1 are operably connected by the sleeve SEL1 of the first synchronizer module SL1. After that, the first clutch CL1 is operated. Then, shift to the first forward speed is completed.

Second Forward Speed

If vehicle speed increases at the first forward speed $1^{ST}$ and shift to the second forward speed $2^{ND}$ is necessary, as shown in FIG. 2, the second speed gear D2 and the first output shaft OS1 are operably connected by the sleeve SEL2 of the second synchronizer module SL2. After that, the first clutch CL1 is released and the second clutch CL2 is operated. Then, the shift to the second forward speed is completed.

After the shift to the second forward speed is completed, the sleeve SEL1 of the first synchronizer module SL1 is moved to a neutral position.

Third Forward Speed

If the vehicle speed increases at the second forward speed $2^{ND}$ and shift to the third forward speed $3^{RD}$ is necessary, as shown in FIG. 2, the third speed gear D3 and the first output shaft OS1 are operably connected by the sleeve SEL1 of the first synchronizer module SL1. After that, the second clutch CL2 is released and the first clutch CL1 is operated. Then, the shift to the third forward speed is completed.

After the shift to the third forward speed is completed, the sleeve SEL2 of the second synchronizer module SL2 is moved to a neutral position.

Fourth Forward Speed

If the vehicle speed increases at the third forward speed $3^{RD}$ and shift to the fourth forward speed $4^{TH}$ is necessary, as shown in FIG. 2, the fourth speed gear D4 and the second output shaft OS2 are operably connected by the sleeve SEL3 of the third synchronizer module SL3. After that, the first clutch CL1 is released and the second clutch CL2 is operated. Then, the shift to the fourth forward speed is completed.

After the shift to the fourth forward speed is completed, the sleeve SEL1 of the first synchronizer module SL1 is moved to the neutral position.

Fifth Forward Speed

If the vehicle speed increases at the fourth forward speed $4^{TH}$ and shift to the fifth forward speed $5^{TH}$ is necessary, as shown in FIG. 2, the fifth speed gear D5 and the second output shaft OS2 are operably connected by the sleeve SEL4 of the fourth synchronizer module SL4. After that, the second clutch CL2 is released and the first clutch CL1 is operated. Then, the shift to the fifth forward speed is completed.

After the shift to the fifth forward speed is completed, the sleeve SEL3 of the third synchronizer module SL3 is moved to a neutral position.

Sixth Forward Speed

If the vehicle speed increases at the fifth forward speed $5^{TH}$ and shift to the sixth forward speed $6^{TH}$ is necessary, as shown in FIG. 2, the sixth speed gear D6 and the second output shaft OS2 are operably connected by the sleeve SEL3 of the third synchronizer module SL3. After that, the first clutch CL1 is released and the second clutch CL2 is operated. Then, the shift to the sixth forward speed is completed.

After the shift to the sixth forward speed is completed, the sleeve SEL4 of the fourth synchronizer module SL4 is moved to a neutral position.

Seventh Forward Speed

If the vehicle speed increases at the sixth forward speed $6^{TH}$ and shift to the seventh forward speed $7^{TH}$ is necessary, as shown in FIG. 2, the seventh speed gear D7 and the second output shaft OS2 are operably connected by the sleeve SEL4 of the fourth synchronizer module SL4. After that, the second clutch CL2 is released and the first clutch CL1 is operated. Then, the shift to the seventh forward speed is completed.

After the shift to the seventh forward speed is completed, the sleeve SEL3 of the third synchronizer module SL3 is moved to the neutral position.

In the power transmitting apparatus according to various embodiments including that shown in FIG. 1, the second speed gear D2 and the fourth speed gear D4 are simultaneously engaged to the second input gear G2 and the third speed gear D3 and the seventh speed gear D7 are simultaneously engaged to the third input gear G3.

Since seven forward speeds can be achieved but the number of input gears disposed on the input shafts can be minimized, it is unnecessary to elongate a length of the input shafts. Therefore, layout change of engine compartments and other design change due to increase of the length of the transmission may be prevented.

In addition, step ratios between shift steps are large at a low-speed region where higher output is necessary but are small at a high-speed region where quick shift and driving efficiency is necessary. The second speed gear D2 and the fourth speed gear D4 having comparatively large gear ratio difference therebetween are simultaneously engaged to the second input gear G2, and the third speed gear D3 and the seventh speed gear D7 having comparatively large gear ratio difference therebetween are simultaneously engaged to the third input gear G3 in the apparatus of FIG. 1. Therefore, drivability and fuel economy may be improved by preventing distortion of step ratios at the high-speed region.

Figure 3:
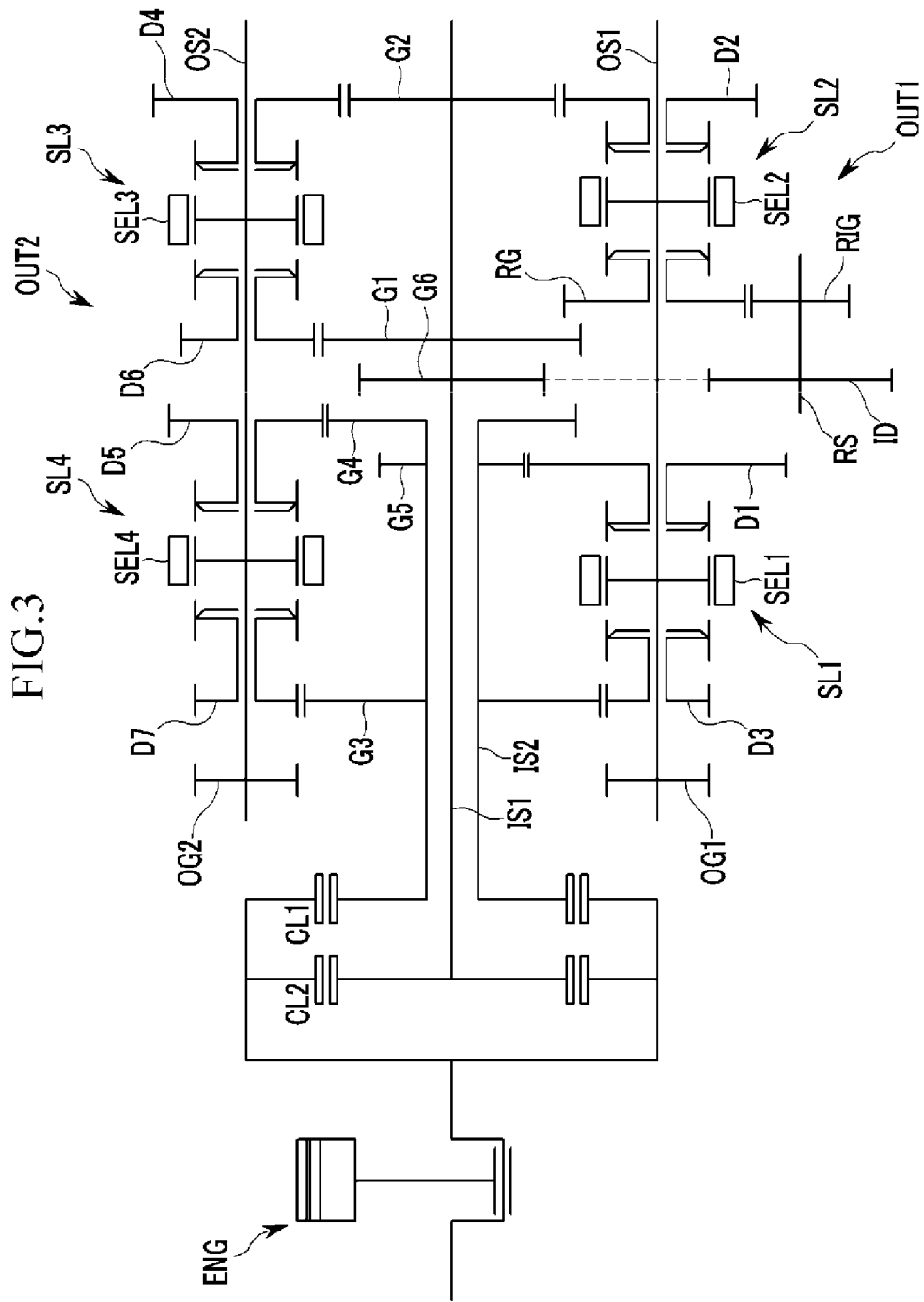
FIG. 3 is a schematic diagram of an exemplary power transmitting apparatus for a vehicle according to the present invention.

FIG. 3 is a schematic diagram of a power transmitting apparatus for a vehicle according to various embodiments of the present invention.

Referring to FIG. 3, the second and third synchronizer modules SL2 and SL3 for the even-numbered speeds are disposed at the front end portions of the output shafts OS1 and OS2 in the apparatus of FIG. 1, but the second and third synchronizer modules SL2 and SL3 for the even-numbered speeds are disposed at the rear end portion of the output shafts OS1 and 0S2 in the apparatus of FIG. 3.

For this purpose, the second input shaft IS2 is a hollow shaft, and the third, fifth, and fourth input gears G3, G5, and G4 are disposed on the second input shaft IS2 in a named sequence from the front portion to the rear portion in the apparatus of FIG. 3. At least a portion of the first input shaft IS1 is inserted in the second input shaft IS2, and the sixth, first and second input gears G6, G1, and G2 are disposed on a portion of the first input shaft IS1 penetrating the second input shaft IS2 in a named sequence from the front portion to the rear portion.

Therefore, the first synchronizer module SL1 is disposed on the front portion of the first output shaft OS1, the third speed gear D3 is engaged with the third input gear G3, and the first speed gear D1 is engaged with the fifth input gear G5. The second synchronizer module SL2 is disposed on the rear portion of the first output shaft OS1, the reverse speed gear RG is operably connected to the sixth input gear G6 through the reverse speed device, and the second speed gear D2 is engaged with the second input gear G2.

In addition, the fourth synchronizer module SL4 is disposed at the front portion of the second output shaft OS2, the seventh speed gear D7 is engaged with the third input gear G3, and the fifth speed gear D5 is engaged with the fourth input gear G4. The third synchronizer module SL3 is disposed at the rear portion of the second output shaft OS2, the sixth speed gear D6 is engaged with the first input gear G1, and the fourth speed gear D4 is engaged with the second input gear G2.

Since constitution and operation of the apparatus of FIG. 3 are the same as those of the apparatus of FIG. 1 except arrangement of the synchronizer modules, detailed description thereof will be omitted.

According to various embodiments of the present invention, the second speed gear and the fourth speed gear are simultaneously engaged with the second input gear, and the third speed gear and the seventh speed gear are simultaneously engaged with the third input gear.

Since seven forward speeds can be achieved but the number of input gears disposed on the input shafts can be minimized, it is unnecessary to elongate a length of the input shafts. Therefore, layout change of engine compartments and other design change due to increase of the length of the transmission may be prevented.

In addition, the second speed gear and the fourth speed gear having comparatively large gear ratio difference therebetween are simultaneously engaged to the second input gear, and the third speed gear and the seventh speed gear having comparatively large gear ratio difference therebetween are simultaneously engaged to the third input gear. Therefore, drivability and fuel economy may be improved by preventing distortion of step ratios at the high-speed region.

For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmitting apparatus for a vehicle comprising:
　a variable connecting device including a first clutch and a second clutch and selectively outputting torque of a power source through the first clutch and the second clutch;
　an input device including a first input shaft selectively connected to the power source through the second clutch and provide with first, second, and sixth input gears fixedly disposed on an exterior circumference thereof, and a second input shaft selectively connected to the power source through the first clutch and provided with third, fourth, and fifth input gears fixedly disposed on an exterior circumference thereof;
　a speed output device including a first output shaft disposed in parallel with the first and second input shafts, a first speed output unit disposed on the first output shaft and provided with first and second synchronizer modules, a second output shaft disposed in parallel with the first and second input shafts, and a second speed output unit disposed on the second output shaft and provided with third and fourth synchronizer modules;
　a reverse speed device including a reverse speed shaft and an idle gear and a reverse input gear fixedly disposed on the reverse speed shaft, wherein the idle gear is engaged with any one input gear on the first and second input shafts and the reverse input gear is engaged with any one synchronizer module disposed on the first output shaft; and
　first, second, third, fourth, fifth, sixth, and seventh speed gears and a reverse speed gear included in the first, second, third, and fourth synchronizer modules;
　wherein the second speed gear and the fourth speed gear are simultaneously engaged with the second input gear disposed on the first input shaft, and the third speed gear and the seventh speed gear are simultaneously engaged with the third input gear disposed on the second input shaft.

2. The power transmitting apparatus of claim 1, wherein the first input shaft is a hollow shaft and the sixth, first and second input gears are disposed on the exterior circumference of the first input shaft in a named sequence from a front portion to a rear portion, and
　at least a portion of the second input shaft is inserted in the first input shaft, and the third, fifth and fourth input gears are disposed on a portion of the second input shaft penetrating the first input shaft in a named sequence from a front portion to a rear portion.

3. The power transmitting apparatus of claim 2, wherein the first synchronizer module includes the third speed gear engaged with the third input gear and the first speed gear engaged with the fifth input gear.

4. The power transmitting apparatus of claim 2, wherein the second synchronizer module includes the reverse speed gear engaged with the reverse input gear connected to the idle gear engaged with the sixth input gear through the reverse speed shaft, and the second speed gear engaged with the second input gear.

5. The power transmitting apparatus of claim 2, wherein the third synchronizer module includes the sixth speed gear engaged with the first input gear and the fourth speed gear engaged with the second input gear.

6. The power transmitting apparatus of claim 2, wherein the fourth synchronizer module includes the seventh speed gear engaged with the third input gear and the fifth speed gear engaged with the fourth input gear.

7. The power transmitting apparatus of claim 1, wherein the sixth, first and second input gears are disposed on the exterior circumference of the first input shaft in a named sequence from a front portion to a rear portion,
　the second input shaft is a hollow shaft and the third, fifth and fourth input gears are disposed on the exterior circumference of the second input shaft in a named sequence from a front portion to a rear portion, and
　at least a portion of the first input shaft is inserted in the second input shaft.

8. The power transmitting apparatus of claim 7, wherein the first synchronizer module includes the third speed gear engaged with the third input gear and the first speed gear engaged with the fifth input gear.

9. The power transmitting apparatus of claim 7, wherein the second synchronizer module includes the reverse speed gear engaged with the reverse input gear connected to the idle gear engaged with the sixth input gear through the reverse speed shaft, and the second speed gear engaged with the second input gear.

10. The power transmitting apparatus of claim 7, wherein the third synchronizer module includes the sixth speed gear engaged with the first input gear and the fourth speed gear engaged with the second input gear.

11. The power transmitting apparatus of claim 7, wherein the fourth synchronizer module includes the seventh speed gear engaged with the third input gear and the fifth speed gear engaged with the fourth input gear.

12. A power transmitting apparatus for a vehicle comprising:
　a first clutch connected to a power source and selectively outputting torque of the power source;
　a second clutch connected to the power source and selectively outputting the torque of the power source;
　a first input shaft being a hollow shaft, selectively receiving the torque of the power source through the second clutch, and provided with sixth, first and second input gears disposed on an exterior circumference thereof in a named sequence;
　a second input shaft penetrating the first input shaft without rotational interference therebetween, selectively receiving the torque of the power source through the first clutch, and provided with third, fifth and fourth input gears disposed on an exterior circumference thereof in a named sequence;
　first and second output shafts disposed in parallel with the first and second input shafts;
　a first synchronizer module disposed on the first output shaft, and including a third speed gear engaged with the third input gear and a first speed gear engaged with the fifth input gear;
　a second synchronizer module disposed on the first output shaft, and including a reverse speed gear engaged with a reverse input gear connected to an idle gear engaged with the sixth input gear through a reverse speed shaft and a second speed gear engaged with the second input gear;
a third synchronizer module disposed on the second output shaft, and including a sixth speed gear engaged with the first input gear and a fourth speed gear engaged with the second input gear; and
a fourth synchronizer module disposed on the second output shaft, and including a seventh speed gear engaged with the third input gear and a fifth speed gear engaged with the fourth input gear.

* * * * *